No. 673,832. Patented May 7, 1901.
G. L. EASON.
AUTOMATIC NUT LOCK.
(Application filed June 4, 1900.)
(No Model.)

UNITED STATES PATENT OFFICE.

GEORGE L. EASON, OF DES MOINES, IOWA, ASSIGNOR OF ONE-HALF TO C. A. THOMPSON, OF SAME PLACE.

AUTOMATIC NUT-LOCK.

SPECIFICATION forming part of Letters Patent No. 673,832, dated May 7, 1901.

Application filed June 4, 1900. Serial No. 19,044. (No model.)

*To all whom it may concern:*

Be it known that I, GEORGE L. EASON, a citizen of the United States, residing at Des Moines, in the county of Polk and State of Iowa, have invented a new and useful Automatic Nut-Lock, of which the following is a specification.

My object is to lock a nut on a bolt by means of a spring in such a manner that the spring will be concealed and protected and also in such a manner that the spring must be broken by extraneous force applied to the nut before the nut can be unlocked.

My invention consists in the construction and application of a spring and peculiar arrangement and combination of parts, as hereinafter set forth, pointed out in my claims, and illustrated in the accompanying drawings, in which—

Figure 1:
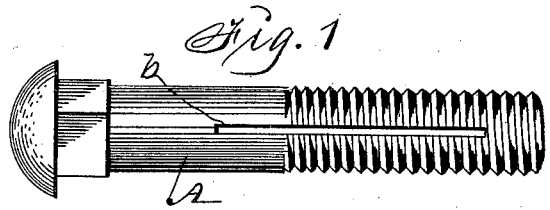
Figure 3:
Figure 2:
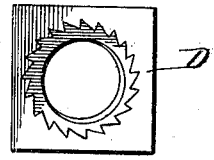
Figure 4:
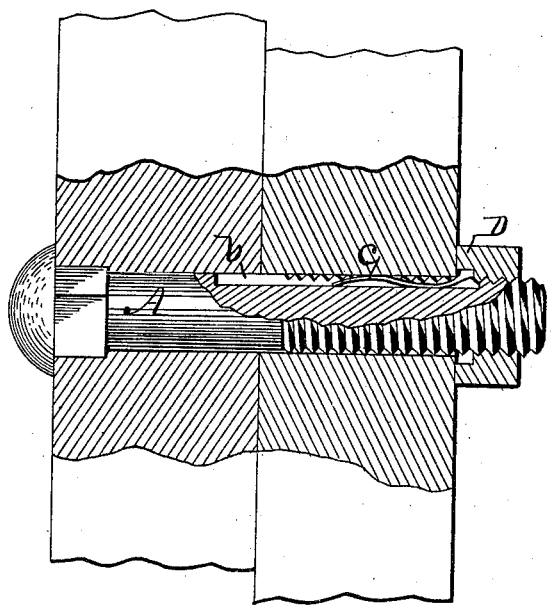

Figure 1 shows a screw-bolt of common form provided with a straight longitudinal groove in its surface. Fig. 2 is a view of a nut of common form provided with a ratchet in its inside face. Fig. 3 is a side view of a leaf-spring adapted to be placed in the groove in the bolt. Fig. 4 is a view showing the invention applied to clamp two overlying pieces together, as required in practical use.

The letter A designates a screw-threaded bolt, provided with a longitudinal groove *b* and adapted to admit the leaf-spring *c*, as shown in Fig. 4. The groove does not extend to the outer end of the bolt and will be covered and concealed by the nut in such a manner that moisture or water cannot enter the groove to corrode and damage a spring fitted in the groove.

The nut D has an internal annular ratchet formed in its inside flat face by means of a die and press or in any suitable way in such a manner that the end of the spring *c* will not interfere with the forward movement of the nut as it is placed on the bolt, but will be engaged by the end of the spring, as required to prevent a backward motion of the nut.

The spring *c* is preferably made of spring-wire and provided with a double curve and one end flattened, as shown in Fig. 3, and adapted to be placed in a groove in a bolt in such a manner that the curves will be straightened and its flattened end projected into engagement with the teeth of an annular ratchet in a depression in the inside face of a nut, as shown in Fig. 4.

To unlock the nut and to remove it from the bolt, force must be applied to the nut to break the concealed spring.

Having thus described the construction and function of each operative part, the practical utility and operation of my invention will be readily understood by persons familiar with the art to which it pertains, and what I claim as new, and desire to secure by Letters Patent, is—

1. In a nut-lock, a curved spring adapted to be inclosed in a straight groove in the surface of a bolt and one end thereof projected into engagement with the teeth of an annular ratchet in a depression in the inside face of a nut, as shown and described for the purposes stated.

2. A nut-lock comprising a screw-bolt provided with a straight groove extending from near the end of the screw-threaded portion toward the head end portion, a curved spring fitted in said groove and its outer end adapted to engage ratchet-teeth in a nut, and a nut having an annular depression in its inside face and internal ratchet-teeth in the depression adapted to engage the end of the spring, arranged and combined to operate in the manner set forth for the purposes stated.

GEORGE L. EASON.

Witnesses:
PERRY L. GRAY,
THOMAS G. ORWIG.